3,657,180
SLIP AGENTS FOR POLYESTER FILM
Gerald Cohn, Akron, Ohio, assignor to The Goodyear
Tire & Rubber Company, Akron, Ohio
No Drawing. Filed Jan. 8, 1970, Ser. No. 1,569
Int. Cl. C08g 51/36
U.S. Cl. 260—31.8 XA                    5 Claims

ABSTRACT OF THE DISCLOSURE

The process of preparing a linear condensation polyester resin containing therein slip agents comprising the addition of a monovalent metallic compound, or a mixture of a monovalent metallic compound and a divalent metallic compound followed by a dicarboxylic acid slurry to a bis glycol ester and condensing the glycol ester to form a polyester resin that when extruded to film displayed good slip characteristics.

---

This invention relates to an improved process for preparing linear polymeric polyester film. More particularly this invention relates to the process of providing improved slip agents in linear polymeric polyester film.

Linear polymeric polyesters are compounds containing in their structural units ester groups of the type derived from interesterification of an organic dicarboxylic acid with dihydric glycols. Films are formed from such polyester resins by extrusion processes in which the resin is heated and fused and extruded through a die to form a sheet which is generally stretched or oriented to form relatively thin films. These films are smooth and have such affinity for each other that they cohere when brought into contact with each other even when under only very slight pressure. Thus, winding the film into a roll under the ordinary tension employed to form a tight roll causes the film surfaces to adhere to one another.

Thus in the preparation of polyester film it is important that slip agents be incorporated in the film to prevent hangups of the film as it is wound or unwound. Slip agents consist of finely dispersed materials that reduce the coefficient of friction between two layers of film. The presence of slip agents is essential to the smooth winding or unwinding of polyester film from a roll. It is further essential to many applications that the film be homogeneous insofar as the appearance is concerned. The appearance of the film must not be so that slip agent particles or related insoluble residues are visible in the applications of the film. The prior are methods of incorporating slip agents into a polymer film have tended to impair the optical qualities of the finished film. In addition, the methods of the prior art are objectionable because of the effect of non-uniform particle sizes and agglomeration of these particles. The prior art has failed to solve these problems.

It is an object of this invention to provide an improved process for preparing polyester film. Another object is to provide an improved process for preparing polyester film containing slip agents. A further object is to provide a film that has a uniform content of slip agent particles. Still another object is to provide a polyester film having good slip characteristics. Other objects will appear as the description of the invention proceeds.

The objects are accomplished by generating solid particles, in finely divided form in situ in the polyester resin, during the production of the resin which is subsequently formed into film. Thus, according to the invention, slip characteristics are imparted to a polyester film by generating within the resin of which the film is made, finely divided solid particles by the addition of a combination of compounds selected from the group consisting of (A) a monovalent metallic compound and a dicarboxylic acid, and (B) a divalent metallic compound, a monovalent metallic compound and a dicarboxylic acid. Generally the preparation of an improved polyester film with slip agents is accomplished by reacting a dicarboxylic acid with a glycol of the series $HO(CH_2)_nOH$ where $n$ is an integer of from 2 to 10 or an ester forming derivative thereof under esterification conditions with the removal of water in the presence of a catalytic amount of a catalyst followed by the condensation in the presence of a slip agent formed in situ and a catalytic amount of a condensation catalyst under reduced pressure with the removal of excess glycol to produce a high molecular weight polyester resin which is extruded to form film.

The process is preferably carried out by reacting dimethyl terephthalate and ethylene glycol in the presence of a monovalent metallic compound under ester interchange conditions followed by the addition of a divalent metallic compound, a dispersion of terephthalic acid in ethylene glycol and a condensation catalyst followed by condensation with the removal of excess glycol to form a polyester resin.

The process can be carried out by reacting dimethyl terephthalate and ethylene glycol in the presence of a lithium salt under ester interchange conditions followed by the addition of a divalent metallic compound and a dispersion of terephthalic acid in ethylene glycol followed by condensation in the presence of antimony trioxide with the removal of excess glycol to form polyester resin. The process can also be carried out by reacting dimethyl terephthalate and ethylene glycol in the presence of a divalent metal compound as catalyst under ester interchange conditions followed by the addition of a monovalent lithium compound and a dispersion of terephthalic acid in ethylene glycol followed by condensation in the presence of a condensation catalyst with the removal of excess glycol to form polyester resin which is extruded into film containing uniform slip agent particles.

The presence of the monovalent metallic compound affects the size and shape of the slip agent. For example, the slip agents generated when lithium compounds are present are spherical in shape and smaller than the slip agents generated when lithium compounds are omitted. It is thought that the slip agent comprises lithium and/or other metal terminated terephthaltae or lithium and/or other metal terminated oligomers. The smaller the size of the precipitated slip agent the more desirable the film from the standpoint of a more varied application.

The slip agent is monovalent metallic-divalent metallic terminated terephthalate and monovalent metallic-divalent metallic terminated oligomers. The slip agent is prepared in situ. When the transesterification catalyst is monovalent metallic compound, the slip agent may be prepared in situ by the addition of a divalent metallic compound and a slurry of terephthalic acid in ethylene glycol at the conclusion of transesterification. When the transesterifiication catalyst is a divalent metallic compound, for example, a calcium compound the slip agent is prepared in situ by adding, at the conclusion of esterification, first a monovalent metallic compound, for example, a lithium compound and then a slurry of terephthalic acid in the ethylene glycol.

For example, when lithium acetate is used as a transesterification catalyst, the slip agent of lithium-calcium terephthalate is prepared in situ by the addition, after transesterification, of calcium glycoxide and a slurry of terephthalic acid in ethylene glycol. When the transesterification catalyst is magnesium acetate, a slip agent of lithium-magnesium terephthalate is prepared in situ by the addition, after transesterification, of lithium acetate followed by the addition of a slurry of terephthalic acid in ethylene glycol.

In general the bulk of the finely divided particles of lithium terephthalate should have a size in the range of 0.1 to 2 microns, since with a particle size below 0.1 micron, adequate slip properties tend not to be obtained, and above 2 microns the film becomes too hazy and less uniform, that is, it has a haze value measured according to ASTM Test D 1003–52 which is above about 2 percent. As the particle size is increased, slip is improved, but haze is increased.

The term "static friction" as used herein is defined as the frictional force of resistance of adhesion in pounds of one movable film surface of one square inch containing a one pound weight on top of another immovable surface at the highest point just before the sample starts to move.

The term "kinetic friction" as used herein is defined as the frictional force in pounds just requested to overcome the above adhesion and keep the film surface in motion.

The terms "film haze" and "film transmission" are determined according to ASTM Test D 1003–61.

The term "haze" as used herein is defined as that percentage of transmitted light, which in passing through the specimen, deviates from the incident beam by forward scattering. For purposes of this application light flux deviating more than 2.5 degrees on the average is considered to be haze.

The term "transmittance" as used herein is defined in accordance with ASTM Test D 307 as the ratio of transmittance to incident light.

The intrinsic viscosity is defined as $$\text{limit } \frac{\ln (\eta_r)}{c}$$

as $c$ approaches zero in which $\eta_r$ is the viscosity of a dilute solution of the resin in a 60/40 phenol/tetrachloroethane solvent mixture divided by the viscosity of the solvent mixture in the same units at the same temperature. For the intrinsic viscosities reported in this specification, a sufficient sample of each resin was dissolved in the solvent mixture to form a solution having a resin concentration of approximately 0.4 gram per 100 cubic centimeters of solution. The time of flow of each solution and of the solvent was measured in a No. 1 Ubbelohde viscosimeter at 30.0° C. and these times were used in the respective viscosities in the equation above.

The following examples illustrate but do not limit the scope of our invention. All references are to weight percent where not specified.

EXAMPLE 1

A glass reaction tube approximately 35 centimeters long having an inside diameter of 38 millimeters, equipped with a sidearm, a nitrogen inlet tube and a stirrer was charged with 70 grams of dimethyl terephthalate, 44 milliliters of ethylene glycol and 42 milligrams of lithium acetate. The mixture was stirred and the reaction tube was heated by a diethylene glycol vapor bath at 197° to 230° C. at atmospheric pressure. Nitrogen gas was slowly passed over the mixture in the reaction tube and after two hours the ester interchange was complete. Then 0.014 gram of calcium glycoxide followed by a dispersion of 0.14 gram of terephthalic acid in 0.585 gram of ethylene glycol was added followed by 21 milligrams of antimony trioxide. The pressure in the system was then reduced over a period of about 30 minutes to 1 millimeter of mercury pressure. Then the mixture was heated to 280° C. by a dimethyl phthalate vapor bath. The condensation was carried out at 280° C. and 1 millimeter of mercury pressure for 2 hours. Film prepared from polymer obtained had an intrinsic viscosity of 0.652 determined in a 60/40 mixture of phenol-tetrachloroethane at 30° C. An amorphous sample of this polymer under 100 times magnification showed bright uniform circular crystallites homogeneously distributed throughout the resin. The data are summarized in Table I.

EXAMPLE 2

An apparatus of the same type used in Example 1 was used for this experiment. Fifty grams of dimethyl terephthalate, 40 grams of ethylene glycol and 0.0179 gram of magnesium acetate were charged into the reaction flask. The mixture was stirred and the reaction tube heated by a diethylene glycol vapor bath. Nitrogen gas was slowly passed over the mixture in the reaction tube and after 90 minutes of heating the theoretical amount of methanol had distilled out of the reaction mixture. Heating was then continued to distill out the excess glycol. After 30 minutes of heating 14 milliliters of ethylene glycol had distilled out. At this point a slurry of .01 gram of calcium glycoxide dissolved in 0.44 milliliter of ethylene glycol and 0.1 gram of solid terephthalic acid having an average particle size between 40 and 100 mesh was added to the reaction mixture. The reaction mixture became hazy. The pressure in the system was reduced to 50 millimeters of mercury pressure and the temperature was raised to 244° C. over a period of 20 minutes. Then the mixture was heated to 280° C. by a dimethyl phthalate vapor bath and the pressure in the system was reduced to one millimeter of mercury pressure over a period of five minutes. The condensation reaction was carried out at 280° C. and one millimeter of mercury pressure for 90 minutes. The polymer obtained had a color rating of 2 on a laboratory color scale and an intrinsic viscosity of 0.60. An amorphous sample of this polymer under 100 times magnification showed large bright bar-shaped crystallites distributed throughout the resin which tended to agglomerate prior to and during film extrusion.

Table I below summarizes the data obtained from films produced from Examples 1 and 2.

TABLE I

| Ex. | Particle size of slip agent | Static friction | Kinetic friction | I.V. |
|---|---|---|---|---|
| 1 | 1 x 1 micron or less | .294 | .333 | .682 |
| 2 | 1 x 3 microns to 1 x 5 microns | .31 | .32 | .688 |

EXAMPLE 3

The procedure of Example 1 was followed except that the transesterification catalyst was 0.07 percent of magnesium acetate based on the terephthalic acid and after completion of transesterification an addition of 0.06 percent of lithium acetate based on the dimethyl terephthalate followed by an addition of 0.2 percent of terephthalic acid in a slurry with ethylene glycol was made. The film prepared contained particles of lithium-magnesium terminated terephthalate slip agent 1 x 1 micron in size. The intrinsic viscosity of the polymer was 0.645. The 1.4 film thickness showed a transmission of 90.7 and haze of 4.4. The static friction was .356 and the kinetic friction was .413. A sample of film prepared from the resin under the electron microscope revealed slip agent particles of 1 x 1 microns or less homogeneously distributed.

The particles that were present as slip agents in the film were examined under an electron microscope. The particles from Examples 1 and 3 were found to be spherical. The slip agent of calcium terephthalate, Example 2, resulted in bar-shaped particles in the range of 1 x 3 microns to 1 x 5 microns.

Films formed from the resins from the working Examples 1 and 3 did not stick together and had good slip characteristics. Film formed from the resin of Example 2 had adequate slip characteristics but displayed excessive visual agglomeration of slip agent particles. The examples illustrate the invention particularly with respect to the use of lithium-calcium terephthalate and lithium-magnesium terephthalate as slip agents. Other monovalent metallic compounds can be used. The monovalent metallic compounds can be added in various forms such as a salt of an aliphatic acid or in the form of the metal oxide or hydroxide. If desired, the metal can be used, but it will be necessary to allow sufficient time for the metal to react to form a soluble compound. Representative examples of monovalent metallic compounds that can be used are organic compounds soluble in the reaction mixture such as lithium acetate, lithium propionate, lithium glycoloxide, potassium acetate, potassium glycoxide, sodium acetate, sodium methylate and inorganic compounds such as the oxides and hydroxides of monovalent metals. Other divalent metallic compounds can be used. The divalent metallic compound can be added in various forms such as a salt of an aliphatic acid or in the form of the metal oxide or hydroxide. If desired, the divalent metal can be used, but it will be necessary to allow sufficient time for the metal to react to form a soluble compound. Representative examples of divalent metallic compounds that can be used are organic compounds soluble in the reaction mixture such as magnesium acetate, zinc acetate, calcium propionate, manganese glycoloxide, and inorganic compounds such as the oxides and hydroxides of divalent metals selected from the group consisting of magnesium, calcium, barium, strontium, manganese, chromium, cobalt, nickel, zinc, cadmium, lead and tin.

The amount of the monovalent metallic compound used can be varied over a wide range. Thus the amount can vary from 0.1 to 2.0 weight percent based on the dimethyl terephthalate used. The preferred amount used will be within the range of 0.1 to .2 weight percent based on the dimethyl terephthalate.

The amount of the divalent metallic compound used can be varied over a wide range. Thus the amount can vary from 0.1 to 2.0 weight percent based on the dimethyl terephthalate used. The preferred amount used will be within the range of 0.1 to .2 weight percent based on the dimethyl terephthalate.

The amount of dicarboxylic acid such as terephthalic acid used will be an amount at least equivalent to the amount of the metallic compound added after ester interchange or stage 1. An excess can be used if desired. Thus the dicarboxylic acid is used in the range of from .02 to 2 weight percent of the glycol ester used. It is generally preferred to use a slight excess of the dicarboxylic acid. The excess will react with the glycol or glycol esters present and become a part of the polymer chain during the condensation reaction. The terephthalic acid can be added as a finely divided solid or dissolved in a suitable solvent such as ethylene glycol or bis hydroxyethyl terephthalate.

The examples illustrate the invention with respect to the use of terephthalic acid. Other dicarboxylic acids can be used. Representative examples of such acids are isophthalic acid, sebacic acid, bibenzoic acid, azelaic, 4,4'-diphenyl dicarboxylic acid, pyromellitic acid and naphthalic acid.

The examples illustrate the invention particularly with respect to polyethylene terephthalate. It can be used with other linear film-forming polyesters such as polyesters obtainable from an organic dicarboxylic acid or ester-forming derivative thereof and a glycol. Representative examples of acids from which such polyesters may be derived are terephthalic acid, isophthalic acid, 1,5-naphthalene dicarboxylic acid, 2,6-naphthalene dicarboxylic acid, 4,4'-diphenyl dicarboxylic acid, 4,4'-diphenic acid, 4,4' - benzophenone dicarboxylic acid, 1,2-di(p-carboxyphenoxy) ethane, 1,2-di(p-carboxyphenyl) ethane and 4,4'-dicarboxy diphenyl ether. Representative examples of glycols from which such polyester resins can be prepared are polymethylene glycols such as ethylene glycol, diethylene glycol, propylene glycol, the butylene glycols and decamethylene glycol, and branched chain glycols such as neopentyl glycol, 2-methyl, 2-ethyl propane diol-1,3 and 2,2-diethyl propane diol-1,3 and cyclohexane dimethanol. The polyesters can be obtained from one or more of the organic dicarboxylic acids or derivatives thereof and one or more glycols. Thus the linear film-forming polyester resin can be a homopolyester or a copolyester. The resin can be modified by substituting an aliphatic dicarboxylic acid for part of the aromatic dicarboxylic acid. Aliphatic dicarboxylic acids that can be used are acids such as adipic acid, sebacic acid and azelaic acid. Representative examples of linear film-forming polyesters are polyethylene terephthalate, polymeric ethylene terephthalate-ethylene isophthalate copolyesters, polymeric ethylene terephthalate - neopentyl terephthalate copolyesters, copolyesters of ethylene glycol units, neopentyl glycol units, terephthalic acid units and sebacic acid units which contain the glycol units in various ratios and the terephthalic acid units constitute a major proportion of the acid units in the copolyester, polyethylene terephthalate-2,6-naphthalate copolyester which contain the acid units in various ratios, polytetramethylene terephthalate, tetramethylene terephthalate-sebacate copolyesters, cyclohexane dimethanol terephthalate, polyethylene bibenzoate and ethylene bibenzoate-neopentyl bibenzoate copolyesters.

The order of addition of the compounds of this invention is critical. When a divalent metallic compound is added to the products of stage 1 containing a monovalent metallic the addition of the dicarboxylic acid must follow the addition of the divalent metallic compound. When a monovalent metallic compound is added to the products of stage 1 containing a divalent metallic compound the dicarboxylic acid is added after the addition of the lithium compound. It is thought that the dicarboxylic acid reacts with the mixture and thus is not free to react with the metal compound if it preceded the addition of a lithium compound or a divalent metallic compound.

In the practice of the invention the preparation of the polyester resin is carried out in accordance with the usual known techniques. Thus the reactions are preferably carried out in the absence of oxygen, generally in an atmosphere of an inert gas such as nitrogen or the like in order to lessen darkening of the resin and to make it possible to obtain a high molecular weight pale or colorless product. The polymerization or condensation reaction is carried out under reduced pressure, generally below 10 millimeters of mercury pressure, and usually below one millimeter of mercury pressure at a temperature in the range of from 260 to 290° C., although other pressures and temperatures can be used according to known practice. The resin is polymerized to a high molecular weight product having an intrinsic viscosity of at least 0.3 and generally of 0.4 or higher as measured in a 60/40 phenoltetrachloroethane mixed solvent at 30° C.

The examples illustrate the process of the invention and show the addition of the free acid and a lithium compound to the product of the stage 1 reaction, the bis glycol ester, followed by ester interchange and polycondensation. The bis glycol ester may contain low molecular weight polymer such as dimer and trimer. If desired, the free acid and lithium compound can be added to oligomers and these materials condensed to high molecular weight resin which can then be formed into film having the improved slip properties.

While certain representative embodiments and details have been shown for the purpose of illustrating the invention it will be apparent to those skilled in this art that various changes and modifications may be made therein without departing from the spirit or scope of the invention as defined in the appended claims.

What is claimed is:

1. A process for preparing a linear condensation polyester resin containing a slip agent formed in situ and dispersed therein which comprises the steps of:
   (1) carrying out a transesterification reaction between an ester forming derivative of a dicarboxylic acid and a glycol of the series $HO(CH_2)_nOH$ where $n$ is an integer of from 2 to 10, employing from 0.06 to 2.0 percent by weight, based on the ester forming derivative, of a transesterification catalyst selected from the group consisting of
- (A) monovalent metallic salts of aliphatic acids, monovalent metallic oxides and monovalent metallic hydroxides of a metal selected from the group consisting of lithium, sodium and potassium, and
- (B) divalent metallic salts of aliphatic acids, divalent metallic oxides and divalent metallic hydroxides of a metal selected from the group consisting of magnesium, calcium, barium, strontium, manganese, chromium, cobalt, nickel, zinc, cadmium, lead and tin, (2) adding from 0.1 to 2.0 percent by weight, based on the ester forming derivative, of a compound selected from the group defined in (B) above when a compound of group (A) is employed as the transesterification catalyst or adding from 0.1 to 2.0 percent by weight, based on the ester forming derivative, of a compound selected from the group defined in (A) above when a compound of group (B) is employed as the transesterification catalyst, (3) adding from 0.02 to 2.0 percent by weight, based on the ester forming derivative, of a dicarboxylic acid and (4) adding a polycondensation catalyst and carrying out a condensation reaction with the elimination of glycol, at a temperature of from 260° to 290° C. at a pressure of about one millimeter of mercury pressure to form a polymeric polyester resin.

2. The process of claim 1 in which the resin formed is shaped in the form of a film.

3. The process of claim 1 in which the ester forming derivative is dimethyl terephthalate and the glycol is ethylene glycol and the slip agent formed in situ comprises lithium-magnesium terminated terephthalate.

4. The process of claim 1 in which the ester forming derivative is dimethyl terephthalate and the glycol is ethylene glycol and the slip agent formed in situ comprises lithium-calcium terminated terephthalate.

5. The process of claim 1 in which the ester forming derivative is dimethyl terephthalate and the glycol is ethylene glycol and the dicarboxylic acid added in step (3) is terephthalic acid.

References Cited
UNITED STATES PATENTS

| | | | |
|---|---|---|---|
| 3,095,403 | 6/1963 | Siggel et al. | 260—75 |
| 3,314,919 | 4/1967 | Most | 260—75 |
| 3,424,727 | 1/1969 | Walker | 260—75 |
| 3,425,998 | 2/1969 | Koch et al. | 260—75 |
| 3,454,540 | 7/1969 | Clovis | 260—75 |
| 3,479,324 | 11/1969 | Carter et al. | 260—75 |
| 3,511,812 | 5/1970 | Stewart et al. | 260—75 |

LEWIS T. JACOBS, Primary Examiner

U.S. Cl. X.R.

260—75 R, 75 M